United States Patent

[11] 3,587,622

[72] Inventor Artson P. Hardison
        Glendora, Calif.
[21] Appl. No. 871,612
[22] Filed Nov. 10, 1969
[45] Patented June 28, 1971
[73] Assignee Schulz Tool and Manufacturing Co.
        San Gabriel, Calif.
        Continuation of application Ser. No.
        656,641, July 26, 1967, now abandoned.

[54] VALVE
        1 Claim, 6 Drawing Figs.
[52] U.S. Cl. .................................................. 137/220,
        137/400, 137/614.21, 251/24
[51] Int. Cl. .................................................. F16k 31/34
[50] Field of Search.......................................... 137/219,
        220, 614.21; 251/34, 35, 36, 43, 44

[56] References Cited
        UNITED STATES PATENTS
2,085,893  7/1937  Boland .......................... 137/219
2,851,055  9/1958  Mosher ......................... 137/400
3,155,108  11/1964 Kahn et al. ................... 137/220
        FOREIGN PATENTS
973,192   10/1964  Great Britain Primary Examiner—Robert G. Nelson
Attorney—Whann and McManigal ABSTRACT: A valve structure including a body and a conduit thereto, the body and conduit forming a valve chamber, and the conduit providing a valve seat with a piston-type valve in the valve chamber engageable with the valve seat and being supported by the body by means of an annular support on the body having a stationary external sealing means, the piston valve having a cylindrical skirt surrounding the annular support on the valve body and engageable with the sealing means to form a pressure chamber within the piston valve and annular supporting wall on the body in combination with means whereby pressure of the fluid in the conduit will open the valve, and fluid pressure within the pressure camber when admitted thereto will function to close the piston valve.

ARTSON P. HARDISON
INVENTOR
WHANN & McMANIGAL
Attorneys for Applicant
BY

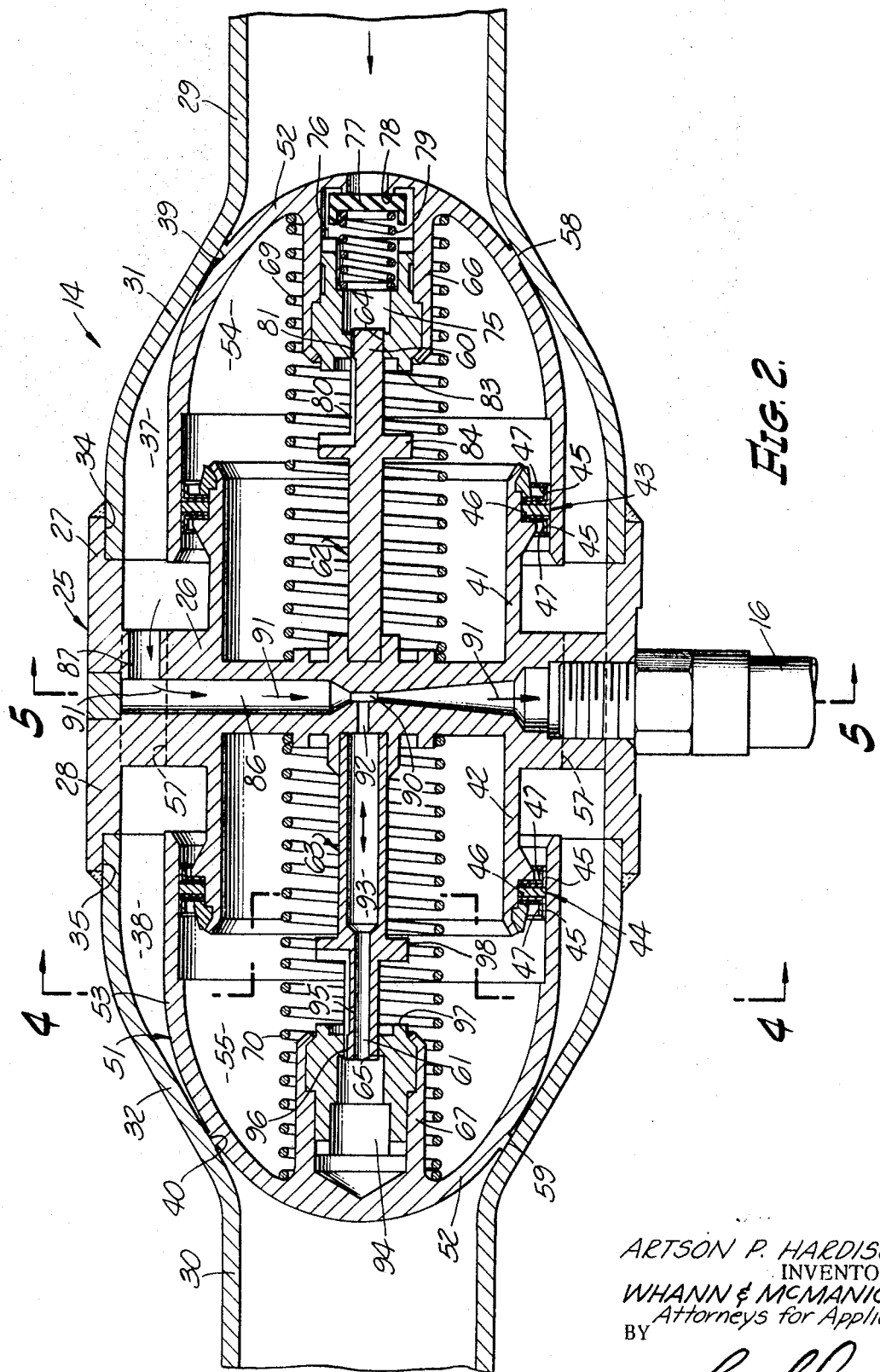

VALVE

This application is a continuation of my copending application Ser. No. 656,641, filed July 26, 1967.

BACKGROUND OF INVENTION

This invention pertains to the art of valves for permitting the closing off of the flow of fluid or liquid through a conduit or from a conduit into a chamber.

In the prior art, valves are somewhat complicated in their construction and are costly to manufacture and costly to repair. See, for example, the U.S. Pat. Ser. No. 2,851,055, issued Sept. 9, 1958, to Mosher.

In the aircraft industry it is of great importance that valves be dependable in their functioning, form absolute closures, be light in weight, and easy to repair.

OBJECTS OF INVENTION

It is an object of the present invention to provide a valve simple in construction, light in weight, and reliable in operation. In its preferred form the parts are welded together and the valve is welded in the conduit in which it is used. The valve is of such a low cost that the intent is that the valve not be repaired, but be replaced by removing the used valve and welding in an entirely new valve. The valve including these desirable points, involves unique features and principles which comprise the herein disclosed invention.

It is an object of my invention to provide a valve in which the conduit or conduits cooperate with the body of the valve to form the valve chamber and valve seat.

It is a further object of my invention to provide a valve as referred to in the preceding paragraph in which the supporting body includes the various seals and passages required in order that the conduit element which cooperates with the body may be of very simple and readily replaceable construction.

It is an object of my invention to provide an arrangement as referred to hereinabove in which the piston valve of the valve structure has a cylindrical skirt and is supported by an annular or cylindrical wall extending from the body, the annular wall extending within the skirt and there being an annular seal engageable between the annular wall or skirt in order to form a pressure chamber within the piston valve.

It is another object of my invention to provide a simplified valve having the unique structural features referred to heretofore in which the conduit provides a conical valve seat and the piston valve element provides a spherical surface engageable with the valve seat in combination with bearing means for supporting the piston valve, the bearing means being located approximately at the center around which the spherical surface is generated.

It is mandatory that the valves do not leak, and, therefore, it is mandatory that the piston valve element will seat perfectly on its seat in order that an absolute closure will be effected. In the past it has been necessary to make parts relatively heavy and of such designs structurally that it will be assured that the valves will seat perfectly. It is an object of my present invention to provide an arrangement in which a piston valve will seat perfectly and it is an object to accomplish this result by providing an arrangement in which the piston valve has a cylindrical bearing or guiding surface and in which there is a second bearing which is positioned to surround a point around which a spherical surface of the valve seating surface is generated.

It is a further object of my invention to provide a valve of the class described in which the valve has a curved nose providing a semispherical seating surface and also has a cylindrical skirt adapted to receive an internal supporting seal which constitutes a sliding bearing arrangement for the piston valve and in which there is a second relatively small diameter bearing surrounding the point around which the semispherical seating surface is generated.

It is an object of my invention to provide a dual valve arrangement in which there is a body comprising the main supporting structure and to which a pair of conduits are connected such as by welding, the pair of conduits being belled or flared adjacent to their points of securement to the body in order to provide a valve chamber on each side of the body and a valve seat on each side of the body and in which there is a piston valve in each of the piston chambers operable to engage the valve seats for closing the valve or to be pressurally disengaged from the valve seats in order to open the valve and permit fluid to pass therethrough.

One form of my invention comprises a dual valve arrangement for a conduit adapted for use in a refueling system of an aircraft and in which the opening and closing of the valves is controlled by pilot means positioned in the fuel tank. This form of my invention includes the broad and narrow aspects of it and will be used in this application as a means for presenting the invention so that those skilled in the art may practice the same.

Referring to the drawings:

FIG. 2 is a longitudinal sectional view through the dual valve of my invention and through the conduit members which cooperate with other parts to form the valve chambers and valve seats;

Figure 1:
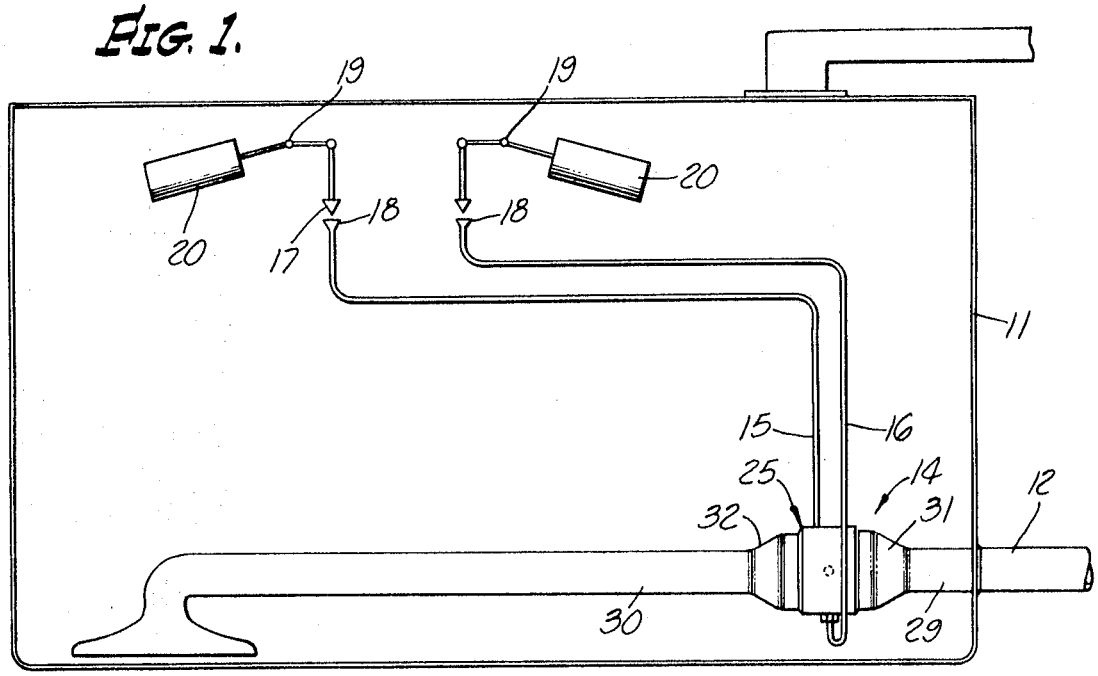
FIG. 1 is a diagrammatic view illustrating the utility of the dual valve arrangement disclosed in detail herein.
Figure 4:
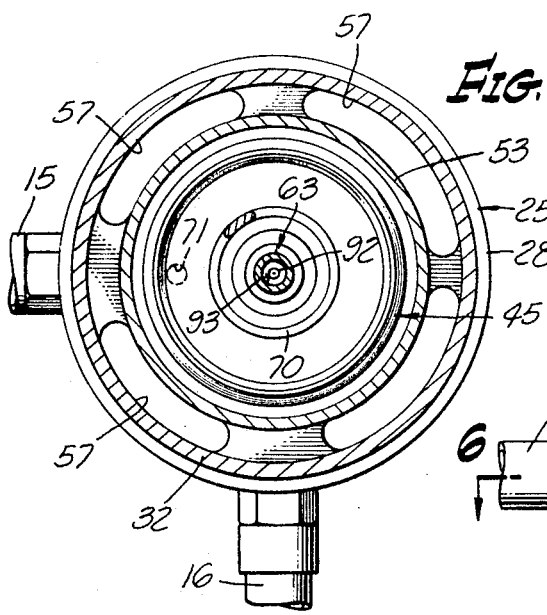
FIG. 4 is a cross-sectional view taken on the line 4—4 of FIG. 2.

Referring to FIG. 1 of the drawings, 11 represents a fuel tank and 12 represents a conduit by means of which fuel is introduced into the tank. In the form of my invention illustrated herein, the dual valve arrangement 14 of my invention is positioned in the fuel inlet conduit and is positioned within the fuel tank, Extending upwardly from the valve are two pipes 14 and 16 which terminate near the upper part of the fuel tank and the open ends thereof are controlled; that is, permitted to be opened or closed by means of pilot valve arrangements diagrammatically illustrated. Each pilot valve arrangement includes a pilot valve 17 engageable with a seat 18 to close the opening of either of the pipes 15 and 16. These pilot valves 17 are connected through link 19 to floats 20, which floats are raised as the fluid level in the fuel tank reaches the upper end of the fuel tank. The raising of the floats moves the pilot valves 17 into engagement with the seats 18 and thus closes the pipes 15 and 16. By virtue of this operation both valves of the dual valve arrangement will be automatically closed in order that further fuel will not be introduced into the fuel tank.

Referring to FIGS. 2 to 6, I will describe the details of construction of a preferred form of my invention as disclosed herein. The numeral 25 represents a body which, like other parts of the invention, with the exception of the seals, are preferably made of a light weight material such as aluminum. The body 25 has a block section 26 and a pair of cylindrical securing flanges 27 and 28 which are cylindrical, in alignment with each other, and project axially from the block 26 in opposite directions.

There is an inlet conduit 29 and an outlet conduit 30 which are enlarged or belled, as indicated at 31 and 32 respectively, the projecting ends of each enlargement or bell being fitted into counterbores 34 and 35 and welded to the flanges 27 and 28, as shown, in order to form a first valve chamber 37 and a second valve chamber 38, the conical portions of each bell forming piston valve seats 39 and 40 respectively. Cylindrical or annular valve supporting walls or flanges 41 and 42 project axially from the block 26 of the body 25 in the pressure chambers 37 and 38 respectively, and each of the cylindrical supports carry external sealing means 43 and 44 respectively which consist of Teflon cups 45 separated by spacers 46 and expanded by expanders 47.

Positioned in the valve chamber 37 is a first piston valve 50 and in the valve chamber 38 is a second piston valve 51. The term "piston valve" is not used in a limited sense but is used because each valve has a nose 52 and a cylindrical skirt or wall 53 which presents an open end toward the block 26. The interior of each piston valve is hollow to provide a space which, in connection with the space within the supports 41 and 42, provides a first pressure chamber 54 and a second pressure chamber 55. It will be noted that the supports 41 and 42 are surrounded by the skirts 53 and that the seals 43 and 44 engage inner cylindrical surfaces 53a of the skirts to form a seal and, at the same time permitting movement of the valves 50 and 51 between closed and open positions; and they also constitute annular bearings for supporting the valves 50 and 51. It will be noted that the seals 43 and 44 are positioned internally of the skirts 53 and are thus protected from the main flow through the valve, which flow is permitted from the chamber 37 to the chamber 38 through passages 57. Each of the pistons 50 and 51 are provided with semispherical seating faces 58 and 59 respectively, which are engageable with the seats 39 and 40 when the valves are in closed position. The semispherical surfaces 58 and 59 are generated around prints 60 and 61 respectively.

Extending axially into the pressure chambers 54 and 55 are first and second metering pin and bearing elements 62 and 63 respectively, which cooperate with cylindrical bearing surfaces 64 and 65 respectively of bosses 66 and 67, which project from the noses 52 of the piston valves 50 and 51. These bearings are positioned around the points 60 and 61 and constitute a second bearing surface for each of the piston valves when they are in closed position. This relationship of the bearing surfaces 64 and 65 with the points 60 and 61 permit an adjustment to be made if there is any slight misalignment, this enabling the piston valves to properly engage their seats.

Springs 69 and 70 are compressed between the block 26 and the noses of the valves in order to assert a force yieldably holding the piston valves 50 and 51 in closed positions when fluid or hydraulic forces are not acting to otherwise position the valves.

Figure 5:
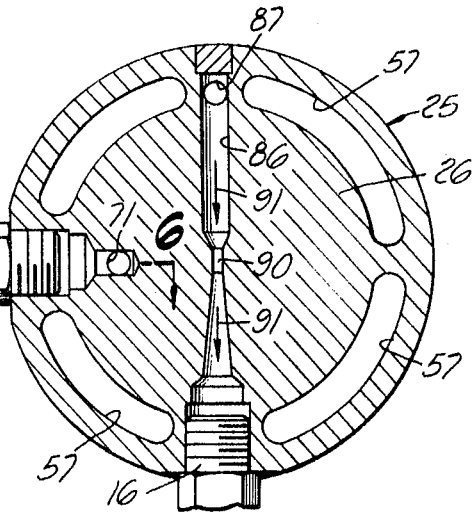
FIG. 5 is a cross-sectional view taken on the line 5—5 of FIG. 2.
Figure 6:
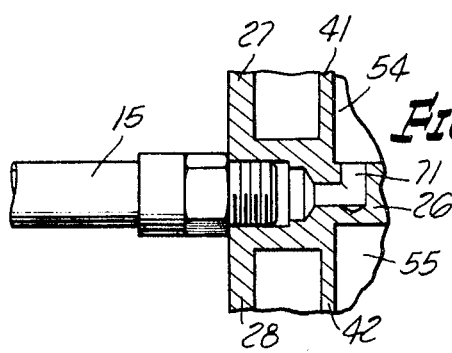
FIG. 6 is a fragmentary sectional view taken on the line 6—6 of FIG. 5.

Formed in the block 26 is a passage 71 as shown best in FIGS. 5 and 6, which is connected to the first pressure chamber 54 and also to the pipe 15, which extends to one of the pilot valves. When the pilot valve is open, the passage 71 is open and fluid pressure, therefore, cannot be built up within the pressure chamber 54.

Provided within the boss 66 and nose 52 of the valve 50 is a passage 75 enlarged at 76 to receive a check valve 77, which is held against an annular seat 78 by means of a spring 79. The inner end of the passage 75 is surrounded by the bearing surface 64 which receives the cylindrical end of the metering pin 62 which has formed in it a metering passage 80 which is of reduced area of cross section near the end of the metering pin as indicated at 81.

Figure 3:
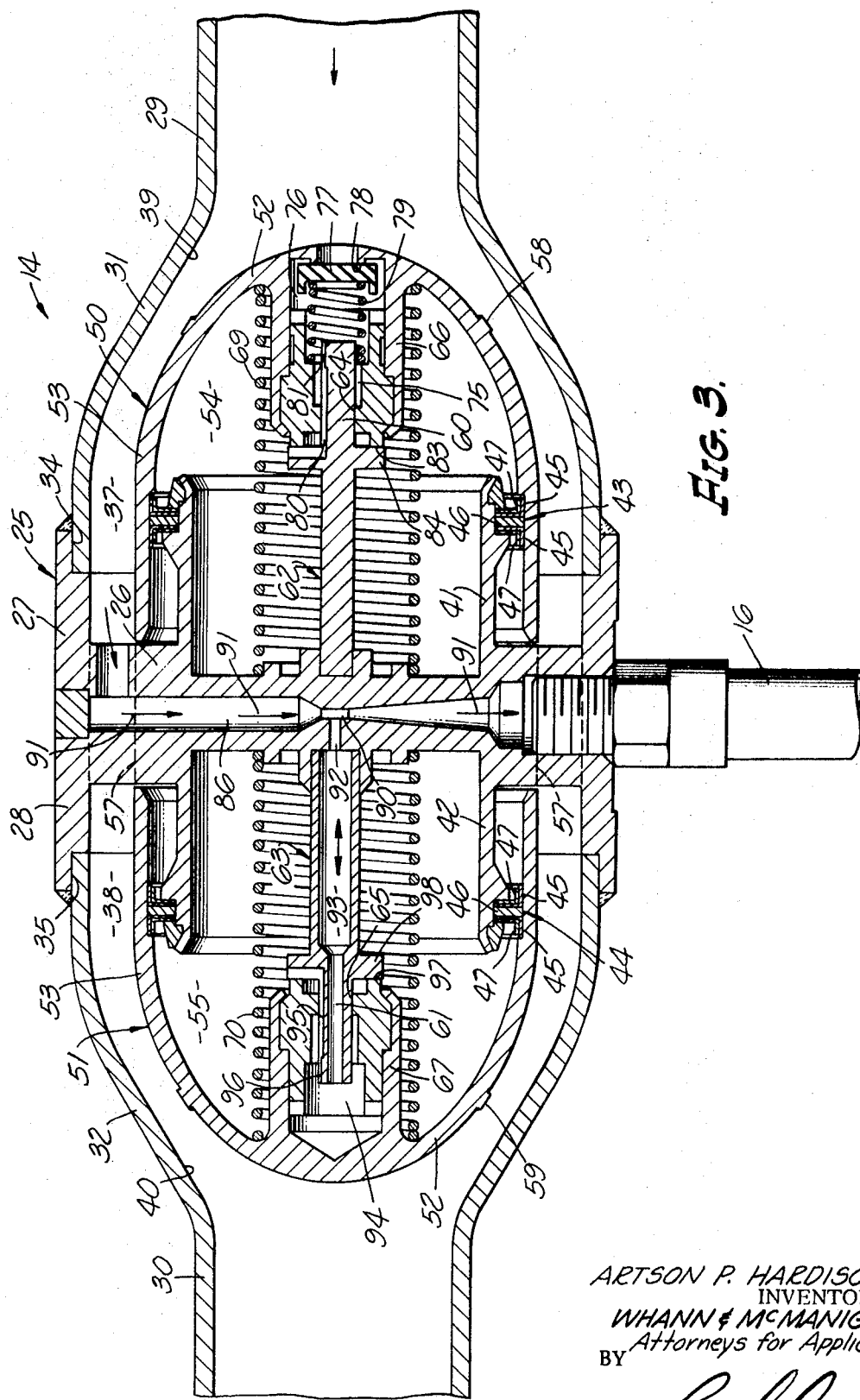
FIG. 3 is a view similar to FIG. 2 but with the piston valves in open position.

When fluid under pressure is introduced into the inlet conduit 29 a force is exerted on the nose of the piston valve 50 and forces this valve into open position as shown in FIG. 3, in which position the end face 83 of the boss engages the stop 84 of the metering pin. It will be noted that the metering opening 80 extends into the stop 84 so that it is not obstructed when the annular face 83 engages the stop 84.

The piston valve 50 moves into open position because the pressure within the chamber 54 is less than the pressure of the fluid against the nose 52. Because of the differential in these two pressures the check valve 77 may move away from its seat and fluid may flow through the passage 75 and the metering passage 80 into the first pressure chamber 54. However, in view of the fact that the pilot valves 17 are open the fuel can flow outward through the passage 71 and the pipe 15 and the pressure within the chamber 54 will be maintained at a pressure less than the pressure against the nose.

The function of the check valve 77 is to prevent reverse flow and a resulting opening of the piston valve. If this is not a factor the check valve 77 may be eliminated.

Also formed within the block 26 is a passage 86 which is connected to the chamber 37 through a port 87. This passage 86 is connected to the pipe 16 which extends to the top of the fuel tank and is controlled by one of the pilot valves 17. The passage is provided with a venturi 90 so that when fluid is flowing through this passage in the direction indicated by the arrows 91, a vacuum or reduced pressure is applied to the axial passage 92 which, in turn, is connected to a passage 93 provided within and which extends to the end of the metering pin 63 in the second pressure chamber 55. The boss 67 has a chamber of passage 94 of which the opening within the bearing surface 65 forms a part. The end of the metering pin which extends through this bearing and into the passage or chamber 94 has a metering passage 95 which is of reduced area of cross section near the end of the metering pin, as indicated at 96.

When fuel is being introduced under pressure through the inlet conduit 29 and the valve 50 has been unseated, the fuel will flow into the chamber 37 through the passages 57 and into the chamber 38. Also, because of the fact that the pilot valves 17 are open at this time, fuel will flow through the port 87 through the passage 91 and through the pipe 16 into the upper part of the fuel tank. This produces a reduced pressure in the venturi which reduces the pressure in the second pressure chamber 55. Because of the shape of the second valve member 51, and the various areas subjected to fluid pressure and acting in different directions, there will be a resulting force to overcome the force of the spring 70 and the piston valve 51 will move into an open position, at which time the end face 97 of the boss 67 will engage the stop 98. Communication to the passage 94 and 93 will not be interfered with, however, because the metering opening is cut into the stop member 98 as shown.

The piston valves 50 and 51 will remain in open position so long as fuel being supplied through the inlet conduit 29 and the passages through the pipes 15 and 16 are open. When the fuel level reaches the top of the tank, the floats 20 are raised and the pilot valves 17 are closed.

This causes the following operation with respect to the first piston valve 50. Closing of the passage 71 will cause the pressure within the pressure chamber 54 to substantially equal the pressure of the incoming fluid and since the areas exposed in a direction to close the valve exceeds those in the direction tending to open the valve, the valve 50, with the cooperation of the spring 69, will gradually move from the position shown in FIG. 3 to the position shown in FIG. 2, the rate of movement of the valve 50 depending on the size of the metering passage 80. As the piston approaches seating position the reduced area position 81 of the metering passage becomes positioned within the bearing 64 and the metering flow is reduced, thus causing the piston to move more slowly as it approaches sealing position.

At the same time that this action just described is taking place the flow of fuel through the pipe 16 is stopped and the fuel, instead of flowing entirely through the passage 91, will flow through the first portion thereof and then flow through the venturi opening 92 and the passages 93, 94, 95 and 96 into the second pressure chamber 55, thus causing the fuel pressure per square inch in the chamber to equal the fuel pressure per square inch around the chamber. Because of the proportioning of areas, which result in a force tending to close the valve 51 being greater than those tending to open it, the valve 51 will move toward closed position, and when the reduced area 96 of the metering passage 95 is within the bearing 65, the flow into the pressure chamber 55 will be reduced and closing movement of the valve will also be reduced as the valve approaches the seat.

When the tank filled and the valves 50 and 51, or either of them closed, the inlet conduit will be closed and may be disconnected from the source of supply. As fuel is used from the fuel tank the valves will remain in these closed positions and will not leave these closed positions until the fuel supply is again connected to the inlet conduit 29 and fuel under pressure supplied thereto as previously explained.

I claim:

1. A valve comprising:
   A. a body structure having a main flow passage means therethrough and having a pair of fixed annular valve supports extending outwardly therefrom in opposite directions in axial alignment and each having external annular sealing means supported thereby;
   B. a pair of chamber forming elements, one being secured at each side of said body structure and each forming a valve chamber and a valve seat;
   C. a pair of piston valves sequentially arranged with respect to said main flow passage, one in each of said valve chambers, each of said piston valves being engageable with one of said seats and each of said piston valves having an annular skirt into which one of said annular supports extend, the said sealing means on said annular supports forming seals with said annular skirts and permitting said piston valves to move between closed and opened positions, said annular valve supports and said piston valves cooperating to provide pressure chambers formed in said skirts and said piston valves and positioned on each side of said body structure;
   D. separate means providing a separate control fluid passage each connected to one of said pressure chambers whereby fluid under pressure may be separately introduced into each of said pressure chambers when fluid is supplied to the inlet of said valve, said upstream piston valve controlling the control fluid passage to the pressure chamber associated with the other of said piston valves;
   E. and means operable to cause fluid pressure to build up in each of said pressure chambers in order to cause each of said piston valves to engage one of said seats.